(12) United States Patent
Guo et al.

(10) Patent No.: US 11,499,875 B2
(45) Date of Patent: Nov. 15, 2022

(54) ANTI-SURGE FLOATING BODY, SEAWATER TEMPERATURE MEASURING DEVICE AND INTEGRATED MEASURING SYSTEM

(71) Applicant: First Institute of Oceanography, MNR, Qingdao (CN)

(72) Inventors: Jingsong Guo, Qingdao (CN); Xin Zhou, Qingdao (CN); Hongyu Ma, Qingdao (CN); Li Li, Qingdao (CN)

(73) Assignee: First Institute of Oceanography, MNR, Qingdao (CN)

( * ) Notice: Subject to any disclaimer, the term of this patent is extended or adjusted under 35 U.S.C. 154(b) by 0 days.

(21) Appl. No.: 16/756,046

(22) PCT Filed: Jul. 15, 2019

(86) PCT No.: PCT/CN2019/095945
§ 371 (c)(1),
(2) Date: Apr. 14, 2020

(87) PCT Pub. No.: WO2020/248323
PCT Pub. Date: Dec. 17, 2020

(65) Prior Publication Data
US 2022/0090970 A1 Mar. 24, 2022

(30) Foreign Application Priority Data
Jun. 14, 2019 (CN) .......................... 201910518411.2

(51) Int. Cl.
*G01K 1/14* (2021.01)
*G01K 13/02* (2021.01)
*G01K 1/024* (2021.01)

(52) U.S. Cl.
CPC ........... *G01K 13/026* (2021.01); *G01K 1/024* (2013.01); *G01K 1/14* (2013.01)

(58) Field of Classification Search
CPC ............. G01K 13/00; G01K 1/14; G01K 1/02
(Continued)

(56) References Cited

U.S. PATENT DOCUMENTS

| 2,084,370 A | * | 6/1937 | Zumwalt .................. | G01K 1/14 374/156 |
| 4,410,282 A | | 10/1983 | Leger et al. | |
| 2012/0037834 A1 | * | 2/2012 | Lang, III .................. | E03F 5/08 251/368 |

FOREIGN PATENT DOCUMENTS

| CN | 1155974 A | * | 8/1997 |
| CN | 201397138 | | 2/2010 |

(Continued)

OTHER PUBLICATIONS

International Search Report and Written Opinion in corresponding PCT/CN2019/095945, dated Feb. 27, 2020.
(Continued)

*Primary Examiner* — Gail Kaplan Verbitsky
(74) *Attorney, Agent, or Firm* — Hovey Williams LLP

(57) ABSTRACT

An anti-surge floating body, a seawater temperature measuring device and an integrated measuring system are provided. The floating material of the anti-surge floating body is in form of a closed loop, the floating material includes a first side close to a central axis of the floating material and a second side away from the central axis, and the wave-proof plate is connected with the second side of the floating material. The hollow space formed by the end-to-end connection of the floating material facilitates normal reception of solar radiation by the seawater, and avoids the influence on the temperature or other seawater parameters of the seawater below the floating material resulting from the floating material blocking solar radiation; moreover, the wave-proof plate can reduce the undulation and heaving of the waves of the seawater, and prevent turbulences of the (Continued)

seawater from affecting the seawater temperature or other seawater parameters.

13 Claims, 9 Drawing Sheets

(58) Field of Classification Search
USPC .............................. 374/136, 208, 100, 156
See application file for complete search history.

(56) References Cited

FOREIGN PATENT DOCUMENTS

| | | | | | |
|---|---|---|---|---|---|
| CN | 103439025 | | 12/2013 | | |
| CN | 203372367 | U * | 1/2014 | | |
| CN | 204370369 | U * | 6/2015 | | |
| CN | 104848900 | | 8/2015 | | |
| CN | 204554010 | U * | 8/2015 | | |
| CN | 105698969 | | 6/2016 | | |
| CN | 205506262 | | 8/2016 | | |
| CN | 106192862 | | 12/2016 | | |
| CN | 106314711 | A * | 1/2017 | | |
| CN | 107179071 | | 9/2017 | | |
| CN | 207180907 | | 4/2018 | | |
| CN | 108216494 | A * | 6/2018 | | |
| CN | 208076379 | | 11/2018 | | |
| CN | 208076379 | U * | 11/2018 | | |
| CN | 208078379 | U * | 11/2018 | | |
| CN | 109334442 | A * | 2/2019 | | |
| CN | 105986563 | B * | 7/2019 | | |
| CN | 110146184 | A * | 8/2019 | | |
| CN | 111505060 | B * | 10/2020 | | |
| CN | 112623117 | A * | 4/2021 | | ............. B63B 22/00 |
| DE | 202008000331 | U1 * | 4/2008 | | ............. B65D 90/52 |
| GB | 1405560 | A * | 9/1975 | | ............. B63B 35/32 |
| JP | H08296509 | A * | 12/1996 | | |
| KR | 20000028613 | A * | 5/2000 | | |

OTHER PUBLICATIONS

Office Action in corresponding CN 2019103002013580, dated Nov. 4, 2019.
Office Action in corresponding CN 2019103002013580, dated Nov. 4, 2019 (English translation attached).
Search Report in corresponding CN 2019105184112, dated Jun. 14, 2019 (English translation attached).

* cited by examiner

ANTI-SURGE FLOATING BODY, SEAWATER TEMPERATURE MEASURING DEVICE AND INTEGRATED MEASURING SYSTEM

CROSS-REFERENCE TO RELATED APPLICATIONS

The present disclosure is the U.S. National Stage of International Patent Application No. PCT/CN2019/095945, filed Jul. 15, 2019, which claims the priority benefit of Chinese Patent Application No. 201910518411.2, filed with the Chinese Patent Office (CNIPA) on Jun. 14, 2019, and each entitled "Anti-surge Floating Body, Seawater Temperature Measuring Device and Integrated Measuring System", the contents of which are incorporated herein by reference in their entirety.

TECHNICAL FIELD

The present disclosure relates to the technical field of dedicated equipment for marine investigation, and particularly to an anti-surge floating body, a seawater temperature measuring device and an integrated measuring system.

BACKGROUND ART

Sea surface temperature is the most important factor that influences the sea-atmosphere interaction, because the temperature variation of the sea surface, which is the bottom boundary of the atmosphere, has direct influence on weather and climate. The diurnal variation process of sea surface temperature is a periodic variation process caused by shortwave solar radiation. Although the diurnal variation process of sea surface temperature is a high-frequency and small-scale variation process, through the sea-atmosphere interaction process, the diurnal variation process of sea surface temperature has very important influence on the variation of oceans and the atmosphere on all scales of average state, within a season and even between years. Therefore, a microstructure measurement of the sea surface temperature has an important effect on improving the capability of coupled-mode forecasting.

In low sea conditions, due to effect of solar radiation, near-surface seawater temperature has a significant vertical hierarchy, which further leads to a hierarchy of seawater density, thereby suppressing the generation of turbulences, further resulting in the attenuation of the vertical exchange between the surface seawater and the lower seawater of the sea, and affecting the heat and gas exchange between the sea and the atmosphere; while during the night, a decrease of the sea surface temperature produces vertical convections, which will in turn intensify the turbulences, thereby enhancing the heat and gas exchange between the sea and the atmosphere. Within just one day, the variations of near-surface seawater temperature of an ocean have completely opposite effects on the heat and gas exchange between the sea and the atmosphere. This process, however, lacks support from long-term, refined observation data. In addition, the above-mentioned process does not take into account of the effect of the background flow field. How the near-surface sea temperature evolves, and affects the heat and gas exchange between the sea and the atmosphere in a shallow sea area with relatively strong tides, are urgently required to be observed, and the observation data thereof are also required to be obtained.

It can be seen that within the depth ranging from 0 to 10 m near the surface of an ocean, a high accuracy and highly vertically hierarchized observation of seawater temperature is of great importance as well as great scientific significance. In the existing measurements of sea surface temperature, satellite observation, cruising observation and fixed-point buoy observation are commonly used observation methods. Collecting data by field observation leads to relatively high cost and has discontinuity in both space and time, and requirements of timeliness of data collection can hardly be met. The satellite observation has a wide observation range and low costs, but as well as a low accuracy of data measurement. Therefore, a device with high accuracy and allowing real-time measurement is urgently required for obtaining the sea surface temperature.

A device for field observation generally needs to be disposed on a floating body. However, while the existing floating bodies have a relatively low degree of suppression to the turbulences and heaving of seawater, and the floating bodies themselves may block the sunlight, which affects the absorption of the solar radiation by the seawater, and ultimately affect the accuracy of the temperature measurement.

SUMMARY

The objects of the present disclosure include, for example, providing an anti-surge floating body, a seawater temperature measuring device and an integrated measuring system, so as to make the collected seawater parameters more accurate and stable.

An embodiment of the present disclosure provides an anti-surge floating body, comprising a wave-proof plate and a floating material, wherein the floating material is in form of a closed loop, the floating material comprises a first side close to a central axis of the floating material and a second side away from the central axis of the floating material, and the wave-proof plate is connected with the second side of the floating material.

Optionally, the floating material has an annular shape and the wave-proof plate has an annular shape, wherein the wave-proof plate is provided on the side close to the central axis of the floating material.

Optionally, the anti-surge floating body further comprises a floating material baffle, wherein the floating material baffle is provided at the bottom of the floating material, and is provided on a side of the wave-proof plate close to the central axis.

Optionally, the wave-proof plate is provided with holes.

Optionally, each hole is dot-shaped or strip-shaped, the wave-proof plate is provided with a plurality of holes, and the plurality of holes are uniformly distributed on the wave-proof plate.

An embodiment of the present disclosure provides a seawater temperature measuring device, comprising a measuring unit, a control unit, a transmission unit and the above-described anti-surge floating body; wherein the measuring unit is provided on the central axis of the floating material; the measuring unit comprising a plurality of temperature measuring modules spliced in sequence; each temperature measuring module comprises a cylindrical shell having a preset length, and temperature sensors mounted on the cylindrical shell at a preset sampling interval; the control unit and the transmission unit are disposed on the anti-surge floating body; the transmission unit is communicatively connected with an external control platform; the measuring unit is below the water surface, each temperature measuring module in the measuring unit is configured to transmit, water temperature data of a corresponding depth collected by the respective temperature sensor, to the control unit in an electromagnetic coupled manner; and the transmission unit is configured to transmit the water temperature data to the control platform for communication.

Optionally, one end of the cylindrical shell of the temperature measuring module is provided with a mounting thread, the other end of the cylindrical shell is provided with a threaded hole for mounting, wherein the mounting thread and the threaded hole for mounting match each other, and adjacent temperature measuring modules are spliced by the respective mounting thread and the threaded hole for mounting.

Optionally, the temperature sensor is provided on one side of the cylindrical shell; or a slot is pre-arranged on the cylindrical shell, and the temperature sensor is disposed in the slot.

Optionally, the cylindrical shell is provided therein with one or more battery compartments for accommodating one or more batteries.

Optionally, the temperature measuring module further comprises a coupled transmission transmitter disposed on a cover of the one or more battery compartments.

Optionally, the control unit and the transmission unit are disposed on the wave-proof plate of the anti-surge floating body.

Optionally, the wave-proof plate and the floating material are detachably connected.

Optionally, the transmission unit comprises a transceiver controller and one or more antennas, the control unit and the transceiver controller in the transmission unit are disposed inside the floating material of the anti-surge floating body, and the one or more antennas in the transmission unit is disposed outside the floating material of the anti-surge floating body.

Optionally, the interior of the floating material is a hollow space, and the hollow space is inflated so that the floating material floats on the water surface.

Optionally, a protective frame is further provided at the bottom of the anti-surge floating body, wherein the protective frame comprises a plurality of cylindrical bodies parallel to the central axis of the floating material, and a plurality of annular bodies parallel to a plane of the floating material, and the plurality of annular bodies are respectively disposed on the cylindrical bodies at a preset interval.

Optionally, the floating material is provided therein with a cross connection assembly, wherein the center point of the cross connection assembly is on the central axis of the floating material, and one end of the measuring unit is connected with the center point of the cross connection assembly.

Optionally, the temperature measuring module further comprises one or more pressure sensor disposed at one end of the cylindrical shell.

Optionally, the control unit comprises a coupled data receiver and a coupled data collector as two parts.

An embodiment of the present disclosure provides an integrated measuring system, comprising the above-described seawater temperature measuring device, and one or more sensor disposed on the wave-proof plate of the anti-surge floating body in the seawater temperature measuring device, wherein each sensor is communicatively connected with the control unit in the seawater temperature measuring device, the sensor is configured to collect the data sensed above the water and transmit the sensed data to the control unit, and the transmission unit is configured to transmit the sensed data to the control platform for communication.

Optionally, the sensor is a temperature sensor, a humidity sensor, a wind speed sensor or an air pressure sensor.

In the anti-surge floating body, the seawater temperature measuring device and the integrated measuring system provided by the present disclosure, the floating material of the anti-surge floating body is in form of a closed loop, the floating material comprises a first side close to the central axis of the floating material and a second side away from the central axis of the floating material, and the wave-proof plate is connected with the second side of the floating material. In this way, the hollow space formed by the end-to-end connection of the floating material facilitates normal reception of solar radiation by the seawater, which avoids the influence on the seawater temperature or other seawater parameters of the seawater below the floating material, with the influence resulting from the floating material blocking the solar radiation; moreover, the wave-proof plate can reduce the undulation and heaving of the waves of the seawater, and prevent the turbulences of the seawater from affecting the seawater temperature or other seawater parameters. Therefore, the anti-surge floating body can make the collected seawater parameters more accurate and stable.

BRIEF DESCRIPTION OF DRAWINGS

In order to more clearly illustrate the technical solutions of the embodiments of the present disclosure or in the prior art, brief description is made below on the drawings required to be used in the description of the embodiments or the prior art. It is apparent that the drawings described below only illustrate some of the embodiments of the present disclosure, and for a person of ordinary skills in the art, other drawings may be obtained from these drawings without inventive effort.

Reference signs: 100—wave-proof plate; 101—floating material; 101*a*—first side close to the central axis of the floating material; 101*b*—second side away from the central axis; 200—floating material baffle; 400—measuring unit;

400a—temperature measuring module; 401—control unit; 402—transmission unit; 403—instrument platform; 404—antenna; 405—second battery compartment; 406—protective frame; 600—cylindrical shell; 601—temperature sensor; 602—mounting thread; 603—threaded hole for mounting; 604—pressure sensor; 605—first battery compartment; 606—coupled transmission transmitter; 1001—seawater temperature measuring device; 1002—stainless steel chain; 1003—Kevlar rope; 1004—weight; 1005—cable-clipped float ball; and 1006—mobile platform.

DETAILED DESCRIPTION OF EMBODIMENTS

The technical solutions of the present disclosure will be described below clearly and completely in connection with embodiments. It is apparent that the embodiments described are only some of the embodiments of the present disclosure, rather than all of the embodiments of the present disclosure. All other embodiments obtained by those of ordinary skills in the art in light of the embodiments of the present disclosure without inventive effort shall fall within the scope of protection of the present disclosure.

Considering the problems that the existing floating bodies have a relatively low degree of suppression to the turbulences and heaving of seawater, and the floating bodies themselves may block the sunlight, which affects the absorption of the solar radiation by the seawater, and ultimately affects the accuracy of temperature measurement, the embodiments of the present disclosure provide an anti-surge floating body, a seawater temperature measuring device and an integrated measuring system. The technique is applicable to parameter observation devices for various water bodies such as oceans, rivers and lakes, and is applicable to the parameter observation process of various water bodies at various places above or under water.

Figure 1:
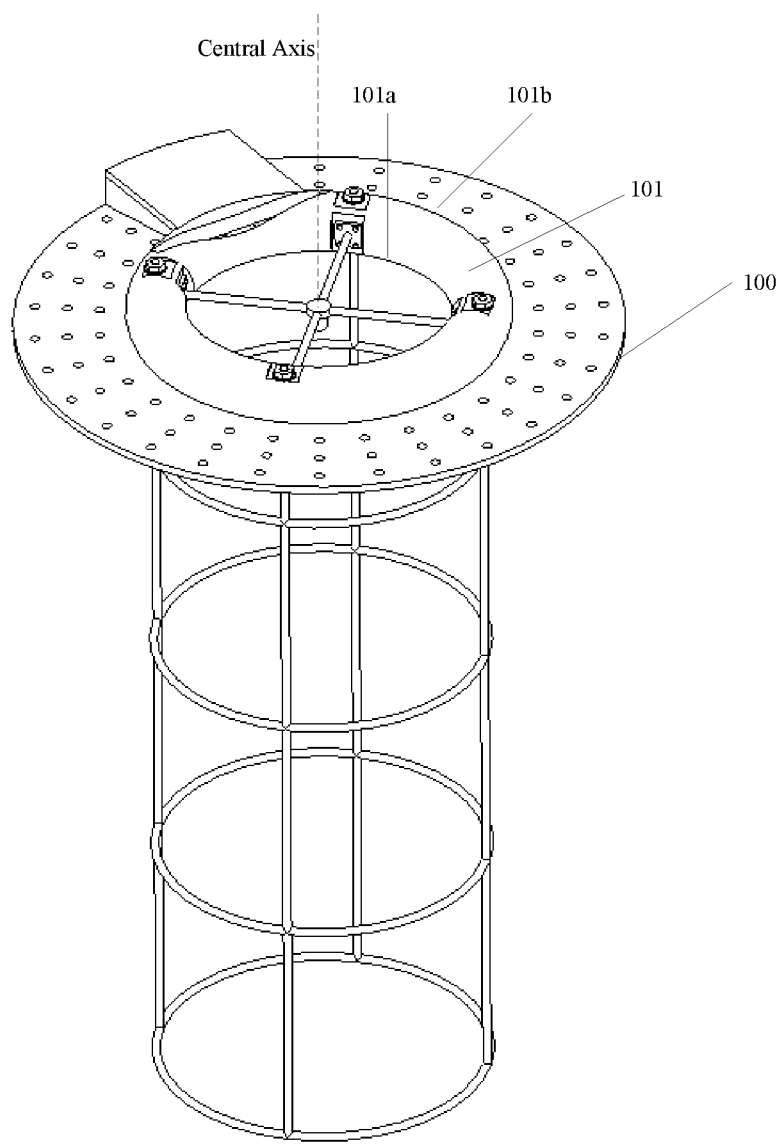
FIG. 1 is a schematic structural diagram of an anti-surge floating body provided in an embodiment of the present disclosure.

First, referring to the schematic structural diagram of an anti-surge floating body shown in FIG. 1, the anti-surge floating body comprises a wave-proof plate 100 and a floating material 101, wherein the floating material is in form of a closed loop, the floating material comprises a first side 101a close to a central axis of the floating material and a second side 101b away from the central axis, and the wave-proof plate is connected with the second side of the floating material.

In the present embodiment, the specific shape of the floating material is not limited. In FIG. 1, an annular floating material is taken as an example. The floating material may also be a triangular, rectangular, or other polygonal floating material. The two ends of the floating material are connected with each other, that is, the floating material is in a closed form regardless of its shape, and the central area of the plane of the floating material is a hollow space in a top view, and the hollow space facilitates the seawater to absorb solar radiation normally, and avoids the influence on the temperature of the seawater below the floating material resulting from the floating material blocking the solar radiation.

Due to the end-to-end connection of the floating material, a first side close to the central axis of the floating material and a second side away from the central axis of the floating material are formed respectively. As shown in FIG. 1, taking an annular floating material as an example, the first side is a side close to the circle center, which may also be referred to as an inner side of the annular floating material, and the second side is a side away from the circle center, which may also be referred to as an outer side of the annular floating material. The wave-proof plate is connected with the second side of the floating material, and the shape of the side where the wave-proof plate is connected with the floating material generally matches the shape of the second side of the floating material, for example, if the second side of the floating material is circular, the inner side of the wave-proof plate is also circular. In FIG. 1, as an example, the shape of the wave-proof plate is the same as that of the floating material, and both shapes are annular.

The floating material of the anti-surge floating body is in form of a closed loop, wherein the floating material comprises a first side close to the central axis of the floating material and a second side away from the central axis of the floating material, and the wave-proof plate is connected with the second side of the floating material. In this way, the hollow space formed by the end-to-end connection of the floating material facilitates the seawater to absorb solar radiation normally, and avoids the influence on the temperature or other seawater parameters of the seawater below the floating material, with the influence resulting from the floating material blocking the solar radiation; moreover, the wave-proof plate can reduce the undulation and heaving of the waves of the seawater, and prevent the turbulences and disturbance of the seawater from affecting the seawater temperature or other seawater parameters. Therefore, the anti-surge floating body described above can make the collected seawater parameters more accurate and stable.

Figure 2:
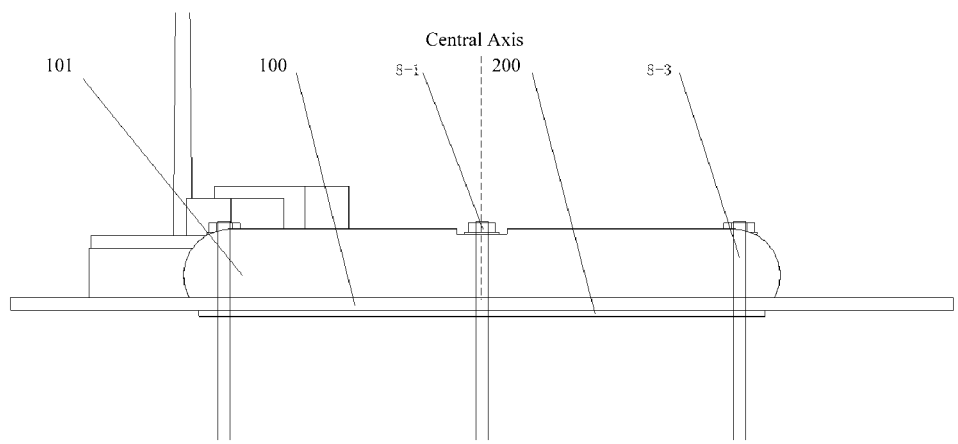
FIG. 2 is a side view of the anti-surge floating body provided in an embodiment of the present disclosure.

The anti-surge floating body is further described below with reference to FIG. 1, FIG. 2 and FIG. 3.

The floating material is annular, and the wave-proof plate is also annular; and the wave-proof plate is provided on the side away from the central axis of the floating material, i.e., the floating material and the wave-proof plate of the anti-surge floating body are in form of double concentric circles. FIG. 2 is a side view of the anti-surge floating body. The anti-surge floating body further comprises a floating material baffle 200, wherein the floating material baffle is provided at the bottom (or middle) of the floating material, and is provided on the side close to the central axis of the wave-proof plate. In this embodiment, the floating material is connected with the wave-proof plate via the floating material baffle, and is fixed by bolt connection. Thus, the floating material is disposed at higher than the wave-proof plate. In other modes, the floating material may also be in snapping connection with the wave-proof plate, or other connection modes may be used, and the horizontal center lines of the floating material and the wave-proof plate may also be on the same horizontal level.

On the basis that the floating material and the wave-proof plate form double concentric circles, in addition to the implementation mode in which the wave-proof plate is disposed on the side away from the central axis of the floating material, the wave-proof plate may be also disposed on the side close to the central axis of the floating material, that is, the radius of the floating material is larger than the radius of the wave-proof plate.

Figure 3:
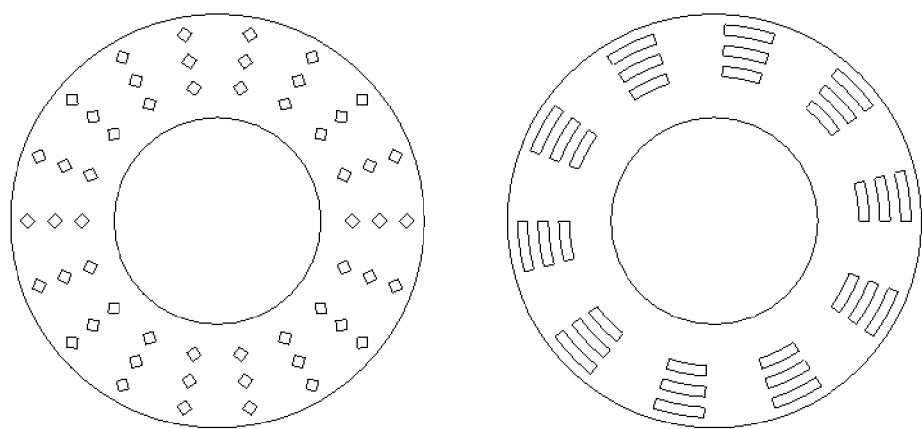
FIG. 3 is a schematic view of a wave-proof plate provided in an embodiment of the present disclosure.

In order to further improve the effect of stabilizing the seawater by the wave-proof plate, as shown in FIG. 3, the wave-proof plate is provided with a hole. In general, the wave-proof plate is provided with a plurality of holes, and the plurality of holes are uniformly distributed on the wave-proof plate. The hole may be realized in various forms, e.g., dot-shaped holes as shown on the left side of FIG. 3, and strip-shaped holes as shown on the right side of FIG. 3, and the specific shape, distribution mode, distribution density, etc. of the holes are not specifically limited here. By providing the holes, it is possible to enable the surface seawater to pass through the holes when disturbance occurs to the seawater, thereby attenuating the degree of heaving of the floating body caused by the disturbance of the seawater, so that the floating material is more stable, and it is also possible to prevent the peripheral waves from flowing into the ring of the annular floating material.

Figure 4:
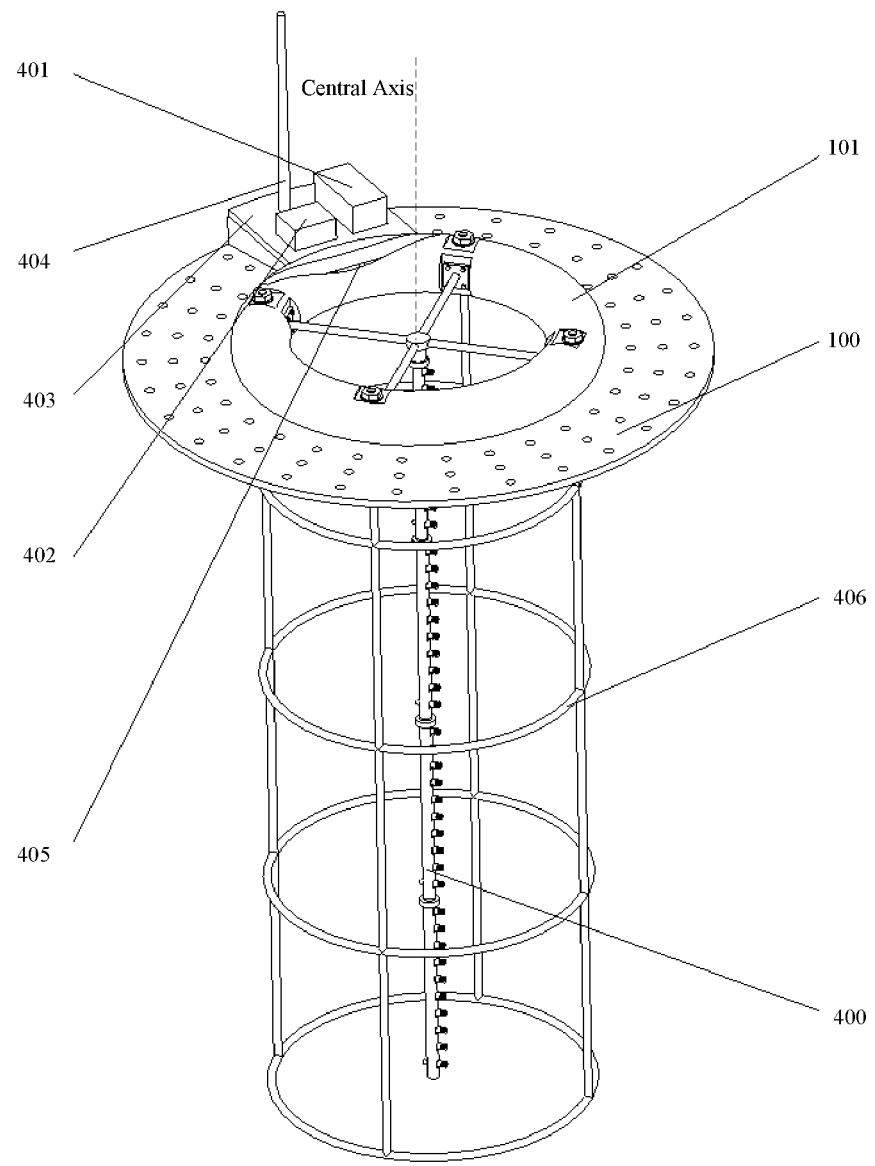
FIG. 4 is a schematic structural diagram of a seawater temperature measuring device provided in an embodiment of the present disclosure.

The seawater temperature in the near-surface depth range of an ocean is not constant, but exhibits a complicated vertical structure, which can be divided into five layers: interface SST (Sea Surface Temperature), skin SST, sub-skin SST, observation depth SST and foundation SST. The seawater in this depth range is at the uppermost layer of the ocean, and is highly susceptible to physical processes such as solar radiation, sea surface wind field, surface waves, diurnal variation and rainfall, and the dynamic and thermodynamic processes constantly change, the vertical temperature structure of the near-surface seawater of the ocean also changes accordingly, and thus has a complicated vertical structure. Therefore, on the basis of the above-described anti-surge floating body, an embodiment of the present disclosure further provides a seawater temperature measuring device. As shown in FIG. 4, the device comprises a measuring unit 400, a control unit 401, a transmission unit 402 and the anti-surge floating body.

Figure 5:
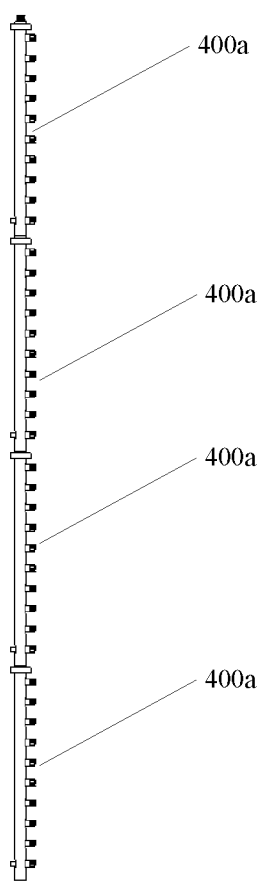
FIG. 5 is a schematic view of a measuring unit provided in an embodiment of the present disclosure.

In the above, the measuring unit is disposed on the central axis of the floating material. In FIG. 4, a cross connection assembly (also referred to as a cross mounting bracket) is provided inside the floating material, the center point of the connection assembly is on the central axis of the floating material, and one end of the measuring unit is connected with the center point of the connection assembly. The measuring unit comprises a plurality of temperature measuring modules 400a spliced in sequence. As shown in FIG. 5, the measuring unit is formed by, for example, connecting four temperature measuring modules in sequence. In practical implementation, the measuring unit may also be provided to have temperature measuring modules in various numbers such as one, five and ten, and as to the number of temperature measuring modules, it may be determined specifically according to the depth of the seawater to be measured and the requirements of actual data. The measuring unit has a spliced structure, the number of temperature measuring modules, the length of each temperature measuring module and the spacing between the sensors in each temperature measuring module are adjustable, and the modular structure is more flexible and facilitates the measurement.

Figure 6:
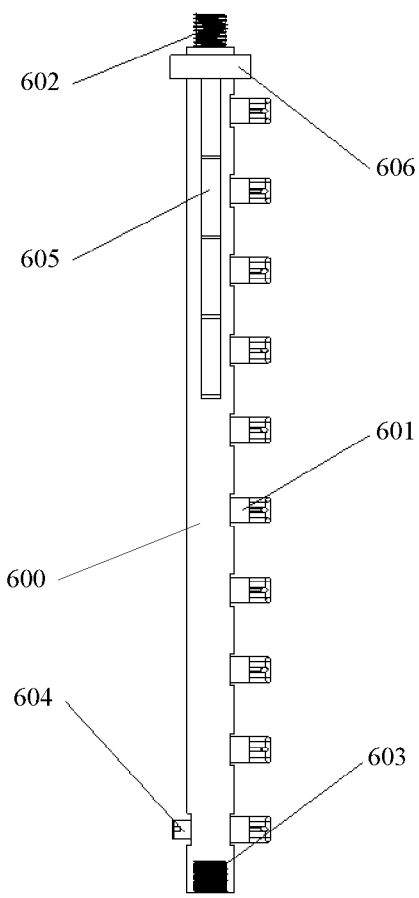
FIG. 6 is a schematic view of a temperature measuring module provided in an embodiment of the present disclosure.

As shown in FIG. 6, each temperature measuring module comprises a cylindrical shell 600 having a preset length, and temperature sensors 601 mounted on the cylindrical shell at a preset sampling interval. FIG. 6 illustrates an example in which ten temperature sensors are uniformly distributed on a cylindrical shell at equal intervals. Evidently, other numbers of temperature sensors may also be provided on the cylindrical shell, that is, the density at which the temperature sensors are disposed may be determined according to actual requirements. The length of each temperature measuring module may be preset, for example, 60 cm, and the spacing between adjacent temperature sensors may also be preset, for example, to be 5 cm. The cylindrical shell may specifically be a pressure-resistant cylindrical shell. In FIG. 6, the temperature sensors are provided on one side of the cylindrical shell. In another implementation mode, a slot may be pre-arranged on the cylindrical shell, and the temperature sensors are disposed in the slot. In addition, one end of the cylindrical shell is provided with a mounting thread 602, and the other end of the cylindrical shell is provided with a threaded hole 603 for mounting. Typically, the interconnected mounting thread and threaded hole for mounting match each other to facilitate mounting, and adjacent temperature measuring modules are spliced by the respective mounting thread and threaded hole for mounting.

Each temperature sensor is powered by a battery pack in a battery compartment. The temperature sensor is powered by 5 V direct current, and the operating current is smaller than 100 mA. When powered by an external battery, the temperature sensor starts to operate, the resistance value of the built-in high-precision platinum resistor varies regularly with the ambient temperature, the variation in resistance value is subjected to analog signal acquisition, analog-to-digital conversion and mathematical calculation through peripheral analog and digital circuits of the platinum resistor, and finally, the quantity of the measured temperature value (e.g., in degree centigrade) can be obtained. The specific model of the temperature sensor may be P85B13K, with a sampling precision of ±0.005° C. and a sampling resolution of 0.0001° C.

The temperature measuring module may further comprise one or more pressure sensors 604 disposed at one end of the cylindrical shell for measuring water pressure. The specific model of the pressure sensor(s) may be KL-9LHP, with a sampling precision of ±0.1 dbar and a sampling resolution of 0.02%. The pressure measuring gradient of the pressure sensor may be 50 cm The cylindrical shell is further provided therein with one or more first battery compartments 605 for accommodating batteries which are configured to supply power to the temperature sensors and the pressure sensor(s). The temperature measuring module may further comprise a coupled transmission transmitter 606 which is configured to transmit the data collected by the temperature sensors and the pressure sensor to the control unit. The coupled transmission transmitter may also serve as a cover of the one or more battery compartments.

Continuing to refer to FIG. 4, the control unit and the transmission unit are disposed on the anti-surge floating body. Specifically, the control unit and the transmission unit may be disposed on the wave-proof plate of the anti-surge floating body, an instrument platform 403 may be pre-arranged on the wave-proof plate, and the control unit and the transmission unit are mounted on the instrument platform, which has a fully watertight design. The transmission unit is communicatively connected with an external control platform. The transmission unit comprises a transceiver controller and an antenna 404. The transceiver controller is connected with the control unit and is configured to transmit data via the antenna to the control platform such as a shore-based laboratory. In actual implementation, the transceiver controller may specifically be a satellite transceiver controller, and the antenna may specifically be a satellite antenna.

The control unit comprises two parts, i.e., a coupled data receiver and a coupled data collector. The coupled data receiver is configured to receive the temperature data and pressure data transmitted by the coupled data transmitter in the measuring unit. The control unit transmits, according to an inductively coupled data transmission mode preset by a user, the data from each sensor to the coupled data collector, and the coupled data collector is configured to store the temperature data and pressure data. After a memory of the control unit acquires the data, the control unit starts and wakes up the transmission unit to start operating and to transmit, according to a preset data transmission protocol, the data to a user office via a satellite transmission link using the satellite transmission module and the satellite antenna.

In FIG. 4, the control unit, the transceiver controller in the transmission unit, and the instrument platform are disposed on the instrument platform of the wave-proof plate. In another implementation mode, the control unit, the transceiver controller in the transmission unit, and the instrument platform may be disposed inside the floating material of the anti-surge floating body, and the antenna in the transmission unit is disposed outside the floating material of the anti-surge floating body. The interior of the floating material is a hollow space which is inflated to enable the floating material to float on the water surface. The hollow space can also accommodate hardware modules such as the control unit and the transceiver controller in the transmission unit, only the antenna is left outside the floating material. In this way, it is possible to realize integration of the hardware modules and the floating material, so as to enable the hardware modules to have better watertightness. In addition, this arrangement manner of built-in hardware enables the hardware to be subjected to less damage in case of high waves, thereby enabling the device, as a whole, to have a longer service life and to be more stable.

The floating material is further provided therein with one or more second battery compartments 405, and the batteries accommodated in the second battery compartments can supply power to the control unit, the transmission unit, etc. A protective frame 406 is further provided at the bottom of the anti-surge floating body, wherein the protective frame comprises a plurality of cylindrical bodies parallel to the central axis of the floating material, and a plurality of annular bodies parallel to a plane of the floating material, wherein the plurality of annular bodies are disposed on the respective cylindrical bodies at a preset interval. The protective frame may be made of stainless steel. At the time of mounting the anti-surge floating body, first, the wave-proof plate is mounted at the floating material baffle, then the annular floating material is mounted on the wave-proof plate, and finally, the wave-proof plate and the annular floating material are locked by connection bolts of the protective frame to form a base portion of the main floating body. The wave-proof plate and the floating material can also be detachably connected. In case of small surges, the wave-proof plate can be removed. In such a case, the protective frame can be realized using steel cables.

The measuring unit is below the water surface, and each temperature measuring module in the measuring unit transmits, the water temperature data of the corresponding depth collected by the respective temperature sensor and the pressure data of the corresponding depth collected by the respective pressure sensor, to the control unit in an electromagnetically coupled manner; and the transmission unit transmits the water temperature data and the pressure data to the control platform for communication. Specifically, the control unit operates according to an inductively coupled transmission mode which is preset and controlled by the user, and the control unit collects and stores the water temperature data and the pressure data. After the memory of the control unit acquires the data, the built-in satellite communication control module of the control unit starts to operate and wakes up the satellite transmission unit to work to transmit the data to the user office (equivalent to the above-described external control platform) via the satellite transmission link by means of the satellite transmission module and the satellite antenna according to the designed data transmission protocol.

Figure 7:
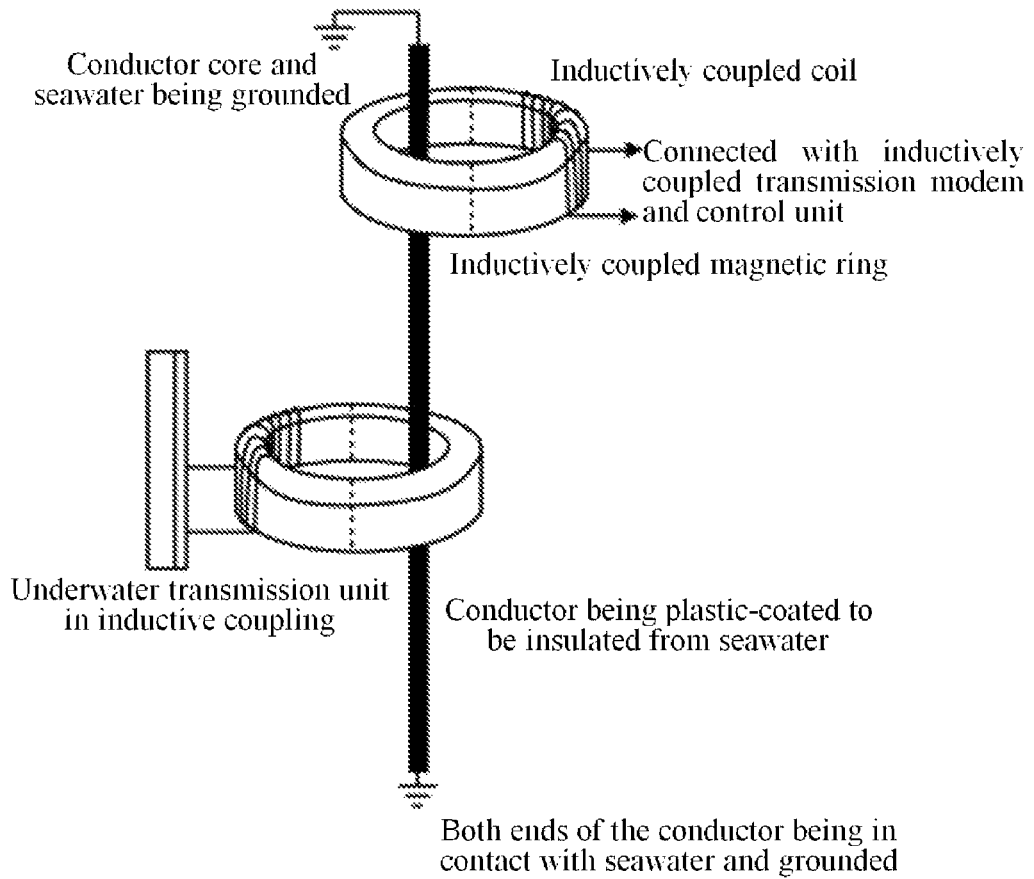
FIG. 7 is a schematic view showing a process of data transmission in an electromagnetic coupled manner according to an embodiment of the present disclosure.
Figure 8:
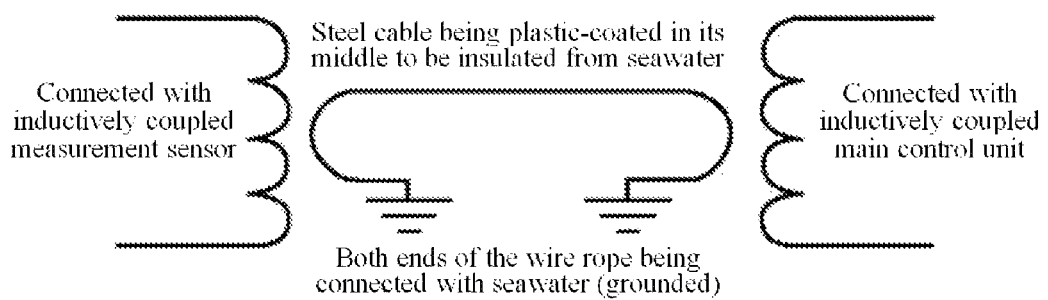
FIG. 8 is schematic view showing another process of data transmission in an electromagnetic coupled manner according to an embodiment of the present disclosure.

Referring to FIGS. 7 and 8, the process of data transmission in an electromagnetic coupled manner will be described in detail below. The core principle of inductive coupling is a transformer system in which two or more magnetic coils share a single magnetic field that is realized by a closed loop formed by a plastic-coated steel cable and seawater, and the plurality of magnetic coils and coils constitute a plurality of windings of the transformer. One of the windings, which is in inductively coupled connection with the control unit, serves as a primary winding, and at the time of data transmission, variable frequency carrier signals modulated by the control unit are applied to both ends of the coil to form magnetic field variations, secondary coil can sense the magnetic field variations and parses original carrier signals therefrom, and the data is received via a digital processing unit, thereby realizing inductively coupled transmission of the data.

Figure 9:
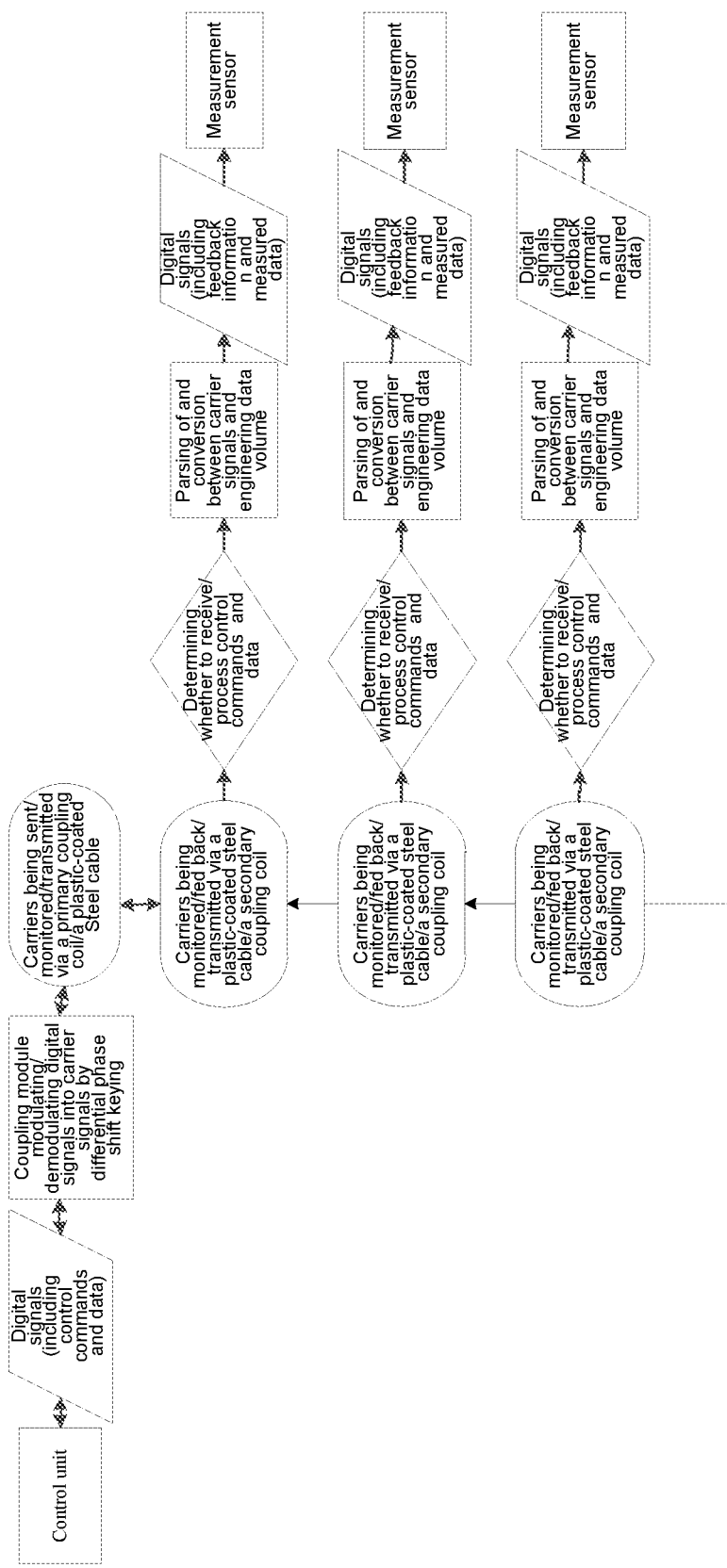
FIG. 9 is a flowchart of data transmission in an electromagnetic coupled manner according to an embodiment of the present disclosure.

FIG. 9 is a flowchart illustrating data transmission in an electromagnetic coupled manner. The control unit may modulate a digital signal to generate a carrier signal, and the carrier signal is sent to each sensor via a primary coupling coil or a plastic-coated steel cable. After receiving the carrier signal, each sensor parses the carrier signal into the digital signal, and, the temperature sensors are controlled to collect temperature data based on the digital signal.

The method of using the seawater temperature measuring device is described as follows: first assembling the measuring unit and the main floating body (equivalent to the above-described anti-surge floating body) separately, and then connecting the control unit, the transmission unit and the measuring unit to the main floating body. After the completion of the assembly, shore-based or ship-based coupled transmission communication test and satellite communication test are conducted, and data collection is to be performed after the completion of the tests.

The assembly method for each unit is described in detail below: (1) the assembly of the main floating body: first, mounting the wave-proof plate at the floating material baffle, then mounting the annular floating material on the wave-proof plate, and finally, locking the wave-proof plate and the annular floating material by connection bolts of the protective frame to form a base portion of the main floating body; next, mounting the instrument platform on the base portion of the main floating body, and then putting a battery into each second battery compartment to complete the assembly of the main floating body; and (2) the assembly of the measuring unit: first, putting a battery in each first battery compartment, mounting a coupled transmission transmitter that not only can be used for communication but also can serve as the cover of the battery compartment; mounting temperature sensors, e.g., 10 temperature sensors, mounting the pressure sensor, cleaning away dust at the thread connections of the top mounting thread and the bottom connection thread, and finally connecting a plurality of temperature measuring modules in series to form the measuring unit. After the completion of the assembly of the main floating body and the assembly of the measuring unit, the control unit, the satellite transmission module and the satellite transmission antenna are assembled on the instrument platform, and then the measuring unit is mounted in the central mounting hole of the main floating body, thereby completing the mounting.

The seawater temperature measuring device can realize high-precision and high-density vertically layered field observation of vertical structures of water (sea water for example) temperature. The device takes the temperature measuring modules having elaborate structures as a basic measuring portion, and supports expanded installation of multiple temperature measuring modules having elaborate structures, each of the multiple temperature measuring modules having elaborate structures is provided, in the length direction thereof, with a plurality of high-precision temperature sensors at equal intervals, and allows the installation of one or more pressure sensor(s) at the bottom of the measuring module, which greatly meets the requirements on accuracy and vertical structure measurement in the ocean coupled mode. The device transmits the data from each sensor to an inductively coupled data collector in an inductively coupled data transmission mode, and then transmits the data to a shore-based numerical simulation laboratory via a satellite communication network in real time, solving the problem of timeliness of field data in a numerical simulation. The anti-surge floating body in the device has a ring-shaped designed and the measuring portion is installed at the center of the ring, which can effectively avoid the influence on the surface seawater temperature resulting from the device itself blocking solar radiation.

The above-described seawater temperature measuring device is applicable to sampling operation on surface seawater of all sea areas, the device operates in a fixed-point anchor system when operations are performed offshore with a relatively small water depth value, and is moored or towed for data acquisition in deep oceans.

Figure 10:
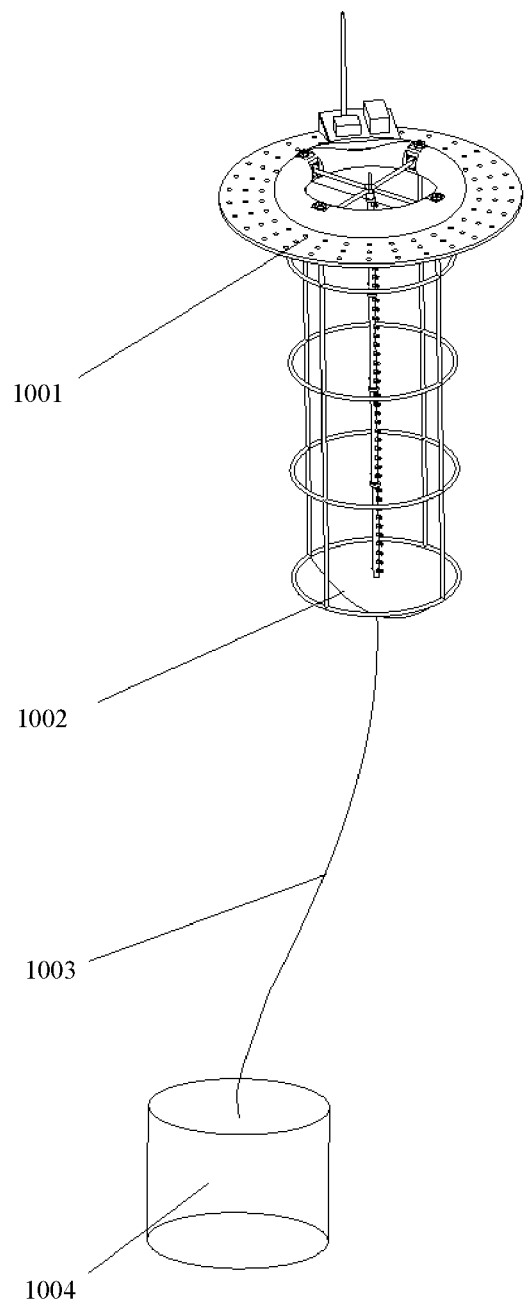
FIG. 10 is a schematic view of an offshore fixed-point anchor system for a seawater temperature measuring device according to an embodiment of the present disclosure.

FIG. 10 is a schematic view of an offshore fixed-point anchor system of the seawater temperature measuring device. The fixed-point anchor system comprises a seawater temperature measuring device 1001, a stainless steel chain 1002, a Kevlar rope 1003 and a weight 1004. As an example, in the fixed-point anchor system, the length of the stainless steel chain is 1 m, the length of the Kevlar rope is about 1.5 times the water depth, and the weight has a weight 3 times that of the main body (i.e., the above-described seawater temperature measuring device). The fixed-point anchor system is used as follows: first, the two ends of the stainless steel chain are connected with the bottom of the main floating body protective frame by shackles, and the weight is connected with one end of the Kevlar rope; next, the other end of the Kevlar rope is connected with the middle of the stainless steel chain; and the connection to the deck is realized. After the connection is completed, deployment is started, first, half the length of the Kevlar rope is put into the seawater, the main body is placed in the water after the Kevlar rope is spread on the sea surface, the direction in which the Kevlar rope floats in the water is controlled in order to prevent the Kevlar rope from wrapping around the main body, and finally, the weight is sunk into the sea to complete the operation of the fixed-point anchor system.

Figure 11:
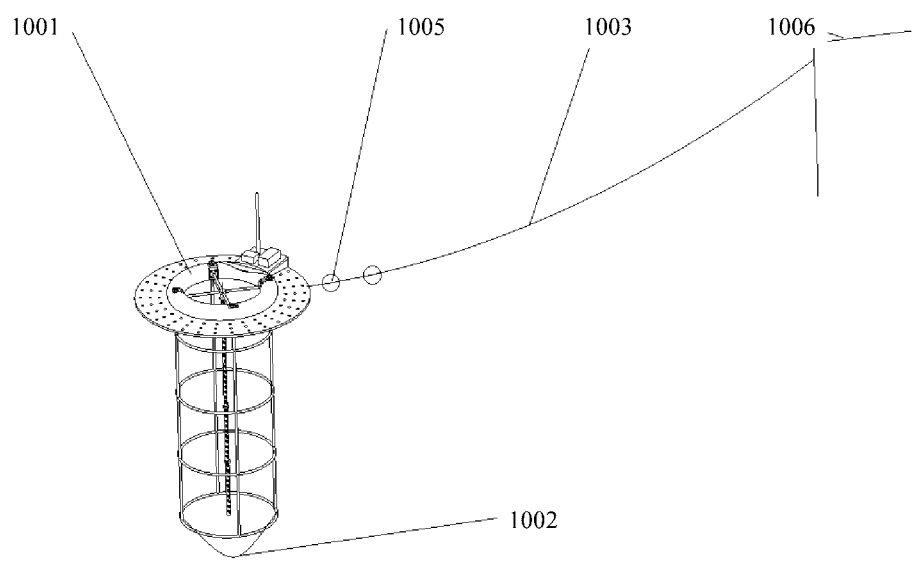
FIG. 11 is a schematic view showing a deep ocean mooring method for a seawater temperature measuring device according to an embodiment of the present disclosure.

FIG. 11 is a schematic view showing a deep ocean mooring method for the seawater temperature measuring device. The deep ocean mooring comprises a seawater temperature measuring device 1001, a stainless steel chain 1002, a Kevlar rope 1003, cable-clipped float balls (float balls clipped on a cable) 1005 and a mobile platform 1006. As an example, in the mooring method, the length of the stainless steel chain is 1 m, and the length of the Kevlar rope is greater than 150 m. The mooring method is used as follows: first, connecting one end of the Kevlar rope to the instrument platform of the main floating body, and placing the cable-clipped float balls at an interval of 5 m on the Kevlar rope from the end of the rope close to the main body; connecting the stainless steel chain to the bottom of the protective frame of the main floating body, mounting the stainless steel chain at the bottom serves the function of ensuring the vertical state of the seawater temperature measuring device as far as possible; next, placing the main body in the water, putting the cable-clipped float balls into the water, putting the Kevlar rope into the water at a controlled speed, and finally, tying the other end of the Kevlar rope to the mobile platform to complete the use of deep ocean mooring.

The above-described seawater temperature measuring device has a temperature measurement accuracy of 0.005° C. and a pressure measurement accuracy of 0.4%, which completely meets the requirements for diurnal variation of sea surface temperature and high-vertical-resolution accurate measurement in the ocean coupled mode. In the present embodiment, the collected data is transmitted in real time via satellite network, which solves the problem of timeliness of data in marine investigation.

Based on the anti-surge floating body and the seawater temperature measuring device described above, the present disclosure further provides an integrated measuring system, comprising the above-described seawater temperature measuring device, and one or more sensors disposed on the wave-proof plate of the anti-surge floating body in the seawater temperature measuring device, wherein each sensor is communicatively connected with the control unit in the seawater temperature measuring device, the sensor is configured to collect the data sensed above the water surface and transmit the data to the control unit, and the transmission unit is configured to transmit the sensed data to the control platform for communication. The sensor may be a temperature sensor, a humidity sensor, a wind speed sensor, an air pressure sensor or the like, and is configured to collect various parameters at a preset height above the water surface. The integrated measuring system can simultaneously collect various parameters at a preset depth below the water surface and various parameters at a preset height above the water surface of the seawater, which is conducive to comprehensive analysis of various indexes of the seawater, enables the data collection to be more convenient, efficient, and more practical.

In the anti-surge floating body, the seawater temperature measuring device and the integrated measuring system, a design idea of modularization is used, a plurality of temperature sensors and pressure sensors are integrated into temperature measuring modules having elaborate structures, the temperature measuring modules are connected in series to form a measuring unit disposed underwater; the anti-surge floating body is designed in the form of a double concentric circles, and the measuring unit is installed at the center position of the inner annular floating material, and this design not only can prevent turbulences and temperature rise of surface seawater resulting from inflow of waves and attenuate heaving and disturbance of the seawater, but also can prevent the inner annular floating material from blocking the seawater surface receiving solar radiation; the data from the underwater measuring unit is transmitted using the digital coupled transmission technology, which can reduce circuit connections underwater; and the control unit operates according to an inductively coupled transmission mode preset by the user, and controls the collection unit to collect and store the data measured by the temperature sensors. After the memory of the control unit acquires the data, the control unit wakes up the satellite transmission unit to work and transmit, according to the preset data transmission protocol, the data to a shore-based laboratory via the satellite transmission link using the satellite transmission module and the satellite antenna, so as to realize real-time updating of numerical simulation data.

The anti-surge floating body, the seawater temperature measuring device and the integrated measuring system described above are featured in modularized design of the measuring part, which increases the expansibility of the measuring unit; and by making use of the characteristic of low power consumption of the sensor, the working time of the device is greatly improved. The device of the present disclosure is relatively small in volume and easy to deploy at sea.

Finally, it should be noted that the above embodiments are only used to illustrate the technical solutions of the present disclosure, rather than limit the same; although the present disclosure has been described in detail with reference to the foregoing embodiments, it should be understood by those of ordinary skills in the art that the technical solutions described in the embodiments can still be modified, or equivalent substitution can be made to some or all of the technical features therein; and the modification or substitution would not cause the substance of the corresponding technical solutions to get out of the scope of the technical solutions of the embodiments of the present disclosure.

INDUSTRIAL APPLICABILITY

The anti-surge floating body, the seawater temperature measuring device and the integrated measuring system provided in the present disclosure enable simultaneous collection of various parameters of the seawater below the water surface at a preset depth and above the water surface at a preset height, so that the collected seawater parameters are more accurate and stable, which is conducive to comprehensive analysis of various indexes of the seawater, and enables more convenient and efficient data collection; moreover, they are relatively small in volume and easy to deploy at sea.

The invention claimed is:

1. An anti-surge floating body, comprising a wave-proof plate, a floating material baffle, and a floating material,
   wherein the floating material is in the form of a closed loop, the floating material comprises a first side close to a central axis of the floating material and a second side away from the central axis of the floating material, and the wave-proof plate is connected with the second side of the floating material;
   wherein the floating material baffle is provided at a bottom of the floating material, and is provided on a side of the wave-proof plate close to the central axis;
   the wave-proof plate is provided with a plurality of holes, and the plurality of holes are uniformly distributed on the wave-proof plate; and
   an instrument platform is pre-arranged on the wave-proof plate.

2. The anti-surge floating body according to claim 1, wherein the floating material has an annular shape, the wave-proof plate has an annular shape.

3. The anti-surge floating body according to claim 1, wherein each hole is dot-shaped or strip-shaped.

4. A seawater temperature measuring device, comprising a measuring unit, a control unit, a transmission unit and the anti-surge floating body according to claim 1,
   wherein the measuring unit is provided on the central axis of the floating material; the measuring unit comprises a plurality of temperature measuring modules spliced in sequence; each temperature measuring module comprises a cylindrical shell having a preset length, and temperature sensors mounted on the cylindrical shell at a preset sampling interval;
   the control unit and the transmission unit are disposed on the anti-surge floating body; the transmission unit is communicatively connected with an external control platform; and
   the measuring unit is below the water surface, each temperature measuring module in the measuring unit is configured to transmit water temperature data of a corresponding depth collected by the respective temperature sensor to the control unit in an electromagnetic coupled manner; and the transmission unit is configured to transmit the water temperature data to the external control platform.

5. The device according to claim 4, wherein one end of the cylindrical shell of the temperature measuring module is provided with mounting threads, the other end of the cylindrical shell is provided with a threaded hole for mounting,
   wherein the mounting thread and the threaded hole for mounting match each other, and adjacent temperature measuring modules are spliced by the respective mounting threads and threaded hole for mounting.

6. The device according to claim 4, wherein the temperature sensors are provided on one side of the cylindrical shell; or a slot is pre-formed on the cylindrical shell, and the temperature sensors are disposed in the slot.

7. The device according to claim 4, wherein one or more battery compartments are provided within the cylindrical shell, with the one or more battery compartments for accommodating one or more batteries.

8. The device according to claim 7, wherein the temperature measuring module further comprises a coupled transmission transmitter disposed on a cover of the one or more battery compartments.

9. The device according to claim 4, wherein the control unit and the transmission unit are disposed on the wave-proof plate of the anti-surge floating body.

10. The device according to claim 4, wherein the transmission unit comprises a transceiver controller and one or more antennas,
    the control unit and the transceiver controller in the transmission unit are disposed in an interior of the floating material of the anti-surge floating body, and the one or more antennas in the transmission unit are disposed outside the floating material of the anti-surge floating body.

11. The device according to claim 4, wherein a protective frame is further provided at the bottom of the anti-surge floating body,
    the protective frame comprises a plurality of cylindrical bodies which are parallel to the central axis of the floating material, and a plurality of annular bodies which are parallel to a plane of the floating material; and the plurality of annular bodies are disposed on the respective cylindrical bodies at a preset interval.

12. The device according to claim 4, wherein a cross connection assembly is provided inside the floating material, a center point of the cross connection assembly is on the central axis of the floating material, and one end of the measuring unit is connected with the center point of the cross connection assembly.

13. An integrated measuring system, comprising the seawater temperature measuring device according to claim 4, and one or more sensors disposed on the wave-proof plate of the anti-surge floating body in the seawater temperature measuring device, wherein each sensor is communicatively connected with the control unit in the seawater temperature measuring device,
    each sensor is configured to collect data sensed above the water surface and transmit the sensed data to the control unit, and the transmission unit in the seawater temperature measuring device is configured to transmit the sensed data to the external control platform.

* * * * *